June 8, 1948.  J. H. EAGLE ET AL  2,443,158
PROCESS CAMERA LENS SCALE
Filed Feb. 28, 1947
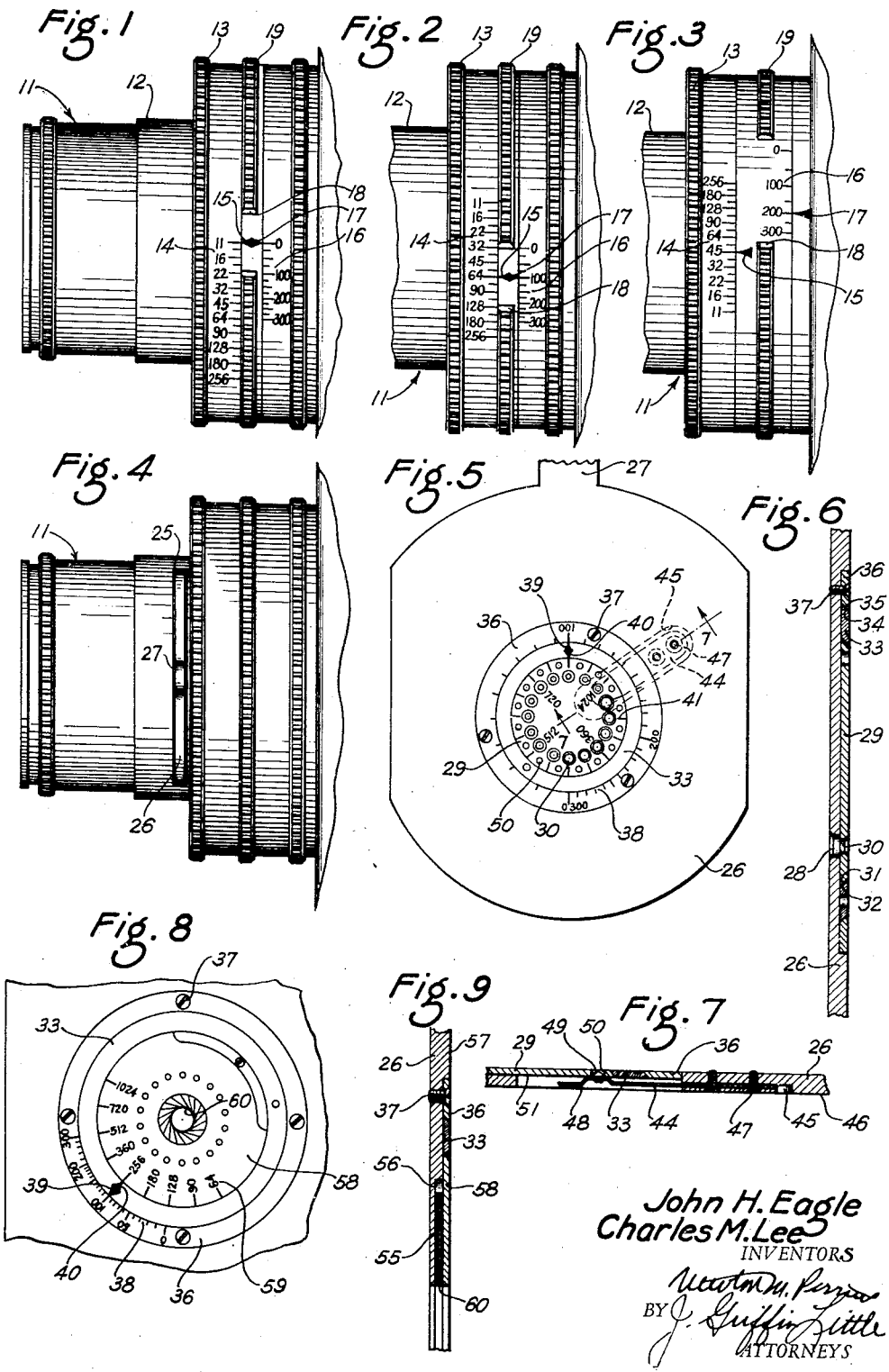
John H. Eagle
Charles M. Lee
INVENTORS
BY
ATTORNEYS Patented June 8, 1948

2,443,158

UNITED STATES PATENT OFFICE 2,443,158

PROCESS CAMERA LENS SCALE

John H. Eagle and Charles M. Lee, Rochester, N. Y., assignors to Eastman Kodak Company, Rochester, N. Y., a corporation of New Jersey Application February 28, 1947, Serial No. 731,556

15 Claims. (Cl. 95—64)

The present invention relates to photography, and more particularly to a process lens for use in the half-tone work.

As is well known, lenses are usually marked in "f" values, which represent the ratios of lens or diaphragm diameters over camera extensions. For example, f/64 represents a ratio of lens or diaphragm diameter to camera extension of 64. Thus the "f" values marked on a lens barrel read directly as fractions of camera extensions. However, this is true only when the lens is focused at infinity. At infinity, the photographic image may be taken as approximately 0.0% of the size of the original. Hence, on the scale giving per cent size of reproduction "f" values are numerically correct as they stand, and give actual fractions of camera extensions. As the per cent reproduction size increases, camera extension increases until at same size, or 100% size, camera extension is twice as great as it was at infinity. In other words, in going from 0.0% to 100% size, the camera extension is doubled. Then in order to maintain the same angular aperture, the lens or diaphragm diameter must be increased in proportion to increase in camera extension. So at 100% (or same size) the lens or diaphragm aperture must be twice as great as at 0.0% (or infinity).

While this "f" system is satisfactory for most purposes, it is not adapted for use by a process photographer whose work is seldom very far from the same size. Apparatus and systems have been devised and sold to save the process photographer the trouble of calculating his stop diameters from his camera extensions, and then translating them into "f" values. Such equipment is expensive and mainly owes its existence to the fact that lens manufacturers persist in making process lens with a scale which has nothing to do with process work. Sometimes, the necessary figures are incorporated in a table, but such an arrangement becomes complicated and unwieldy.

In order to overcome these disadvantages, the present invention provides a method of graduation of process lens so as to correct directly for camera extension so that half-tone work can be done without calculation by the photographer, or reference tables, or installation of accessory equipment.

The present invention has as its principal object the provision of an auxiliary scale for a process lens so that the diaphragm aperture may be varied to correct for camera extension.

A further object of the invention is the provision of such an auxiliary scale which is used in cooperation with the "f" scale commonly employed by lens manufacturers for process lenses.

A still further object of the invention is the provision of scales by which the proper diaphragm opening may be secured readily, quickly, and accurately.

Yet another object of the invention is the provision of such an auxiliary scale which is carried directly by the lens mount or associated therewith, thus eliminating the auxiliary or additional apparatus for properly adjusting the diaphragm opening.

In its broadest aspect, the present invention provides a percentage of magnification scale mounted on or associated with the lens mount adjacent an "f" scale. This percentage scale is so arranged that percentage figures on the scale are angularly spaced in proportion to the logarithm of $$\left(\frac{M}{100}+1\right)$$

where M is the percentage of enlargement or reduction. A further requirement is that the angular space from 0 to 100 per cent on the magnification scale must be equal to the angular space occupied by two full stops on the "f" number scale. This scale cooperates with an index mark by which the scale is adjusted for a pre-selected percentage. Such adjustments serve to position a second index mark with which the "f" scale is movably related, so when the proper part of the "f" scale is brought into registry with the second index the diaphragm opening is adjusted in accordance with the selected camera extension. The "f" scale is arranged in cooperation with diaphragm blades which are so designed that equi-angular divisions on the scale represent "f" numbers in logarithmic progression. Thus, the proper diaphragm aperture opening may be readily, easily, and accurately secured, without resort to complicated and unwieldy tables or accessory equipment.

To these and other ends, the invention resides in certain improvements and combinations of parts, all as will be hereinafter more fully described, the novel features being pointed out in the claims at the ends of the specifications.

In the drawings:

Fig. 1 is a side elevation of a lens mount showing the relation thereto of one scale arrangement of the present invention;

Fig. 2 is a view similar to Fig. 1, showing the position of the scales when the lens diaphragm is adjusted to correct for percentage of enlargement or camera extension;

Fig. 3 is a partial view of a lens mount showing a modified arrangement of scales;

Fig. 4 is a view similar to Fig. 1, but showing a lens mount formed with a slot adapted to receive a Waterhouse stop;

Fig. 5 is a front view of a Waterhouse stop provided with the scale arrangement of the present invention and a diaphragm with a series of progressively varying sized apertures;

Fig. 6 is a vertical sectional view through the stop illustrated in Fig. 5, showing the arrangement of the various parts;

Fig. 7 is a partial sectional view through the stop illustrated in Fig. 5, showing the holding and positioning means for the diaphragm;

Fig. 8 is a partial view of a stop of the type illustrated in Fig. 5, showing an iris type diaphragm, and the scale arrangement of the present invention; and Fig. 9 is a partial sectional view through the stop illustrated in Fig. 8, showing the arrangement of the parts.

Similar reference numerals throughout the various views indicate the same parts.

Figs. 1 to 3 show an arrangement in which the scales of the present invention are positioned directly on a lens mount 11 which comprises a lens carrying tube 12 in which the various lens elements are mounted. The lens mount has also positioned therein a diaphragm of the iris type which is operatively connected with a diaphragm operating ring 13 rotatably positioned on the lens mount so that rotation of the ring 13 will adjust the diaphragm leaves to vary or adjust the diaphragm opening. As such an arrangement is well known to those in the art, and does not, per se, constitute a part of the present invention, a detailed showing is not deemed necessary.

A diaphragm scale 14 is carried by the operating ring 13, and this scale is calibrated in the "f" system to show the commonly used quotients of the ratios of camera extension to lens or diaphragm opening, and is adjusted to an index mark or member 15 to be later described. As with ordinary lens mounts, the ring 14 is rotated to bring a selected part thereof into registry with the mark 15 to adjust the diaphragm opening. However, the scale 14 is arranged to cooperate with diaphragm blades which are of such a construction that equi-angular divisions on the scale represent "f" numbers in logarithmic progression.

As mentioned above, the "f" scale reads correctly only when the lens is at infinity, and as process photographers do not use lenses at infinity, such a scale arrangement is not satisfactory. In order that such an "f" scale can be used in connection with process lenses, the present invention provides an auxiliary percentage magnification scale 16 mounted on the lens mount adjacent the "f" scale, as shown in Figs. 1 to 3. This percentage of magnification scale is logarithmic, as above described, and is calibrated in percentage of reproduction size to copy size. For example, 100% corresponds to reproduction which is the same size as the copy, while 200% corresponds to enlargements of twice the size of the copy. This auxiliary scale cooperates with an index mark or member 17 to be later described.

In the arrangement shown in Figs. 1 and 2, the percentage of magnification scale 16 is arranged in fixed position on the lens mount, and the two index marks 15 and 17 are formed on a cutaway portion 18 of a calculator ring 19 rotatably carried by the lens mount and positioned between the scales 14 and 16. In these figures, the marks 15 and 17 are shown in alignment, but such an arrangement is not necessary as the marks may be staggered, as shown in Fig. 3. With the latter arrangement, the position of scale 14 obviously must be changed relative to the ring 13 so as to be in proper relation to scale 16 and the mark 15.

The copy to be reproduced should be marked to indicate the size of reproduction desired. This size is marked in percent, such as 200%, to indicate an enlargement of two times. The camera parts are then adjusted for the desired reproduction size. In order that the diaphragm opening may be proper for the particular camera extension necessary, the calculator ring 19 is rotated to bring the index mark 17 into register with a proper designation of scale 16. Fig. 2 shows the mark 17, at 100% on the scale 16, thus showing that 100% (or same size) reproduction is to be made. The movement of the calculator ring 19 to adjust the index mark 17 also serves to position the mark 15, as the latter is carried by or movable as a unit with the ring 19 and mark 17. The diaphragm or operating ring 13 is then rotated to bring the proper part thereof into registry with the positioned mark 17. Fig. 2 shows the arrangement in which the lens is adjusted for 100% reproduction at f/64. When the scales are adjusted as shown in Fig. 2, the diaphragm opening is properly adjusted to compensate for camera extension, the advantages of which will be readily apparent to those in the art.

Fig. 3 shows a slightly modified arrangement in which the scale 16 and the index mark 17 are reversed, the mark being fixed on the lens mount while the scale is mounted and is movable as a unit with the calculator ring 19. In this embodiment, the scales are set at 200% reproduction (enlargement of two times), at f/45. To secure this adjustment, the calculator ring is rotated first to bring the 200% mark of the ring into registry with the fixed index mark 17. Thereafter the diaphragm operating ring 13 is rotated to position f/45 in registry with the index mark 15.

By means of the above arrangements, the process photographer may easily, quickly, and accurately adjust the diaphragm opening in accordance with the particular camera extension used in the reproduction.

Figs. 4 to 9 show still another arrangement of the scales of the present invention, as applied to Waterhouse stops. As is well known, such stops are used in lens mounts formed with a transversely extending slot, such as shown at 25, adapted to receive a flat plate 26 on which the desired stops or aperture sizes are mounted. This plate is provided with a protruding handle 27 to facilitate insertion of the plate 26 into and the removal thereof from slot 25. These Waterhouse stops are usually provided with apertures of definite shapes and sizes to secure specific results. In prior structures, however, no arrangement was provided to adjust or vary the aperture size of the stop in accordance with the camera extensions. The result was that a separate aperture plate would be required for each variation and reproduction size.

The present invention overcomes these difficulties by providing a Waterhouse or slide stop having an adjustable aperture and an arrangement by which the aperture may be adjusted in accordance with the camera extension so that the proper aperture is provided for the particular size reproduction being made. One form of such slide stop is illustrated in Figs. 5 to 7, which shows a stop plate 26 formed with an exposure aperture 28 which represents the maximum opening desired. A plate 29 is rotatably mounted on the plate 26 and is provided with an annular arrangement of apertures or openings 30 of progressively varying size, as clearly shown in Fig. 5. These aperture sizes are calculated in accordance with the "f" system. The edge 31 of the plate 29 is beveled to engage a similarly beveled edge 32 of a calculator ring 33, the opposite edge 34 of which is also beveled to engage a beveled edge 35 of the ring 36 held in place on the plate 26 by screws 37 or other suitable fastening means. Thus, the ring 36 is held securely on the plate 26, and serves to retain the ring 33 in place and the latter, in turn, secures the plate 26 in operative rotative relation with the aperture 28. The outer ring 36 has scribed or otherwise formed thereon a logarithmic scale 38, which, like scale 16, is calibrated in percentage of reproduction to copy size. This scale 38 cooperates with an index mark 39 carried by the calculator ring 33. The latter is also provided with a second index mark 40, similar to mark 15, which cooperates with the apertures 30 and the scale 41 associated therewith. While the two index marks 39 and 40 are shown in alignment, this is by way of illustration only, as it is apparent that the marks may be out of alignment, as illustrated in Fig. 3, but with such an arrangement, the position of apertures 30 must be varied accordingly, as is apparent.

In use, the calculator ring 33 is rotated on plate 26 to position the index mark 39 in registry with the proper portion of the scale 38 to indicate the size reproduction. Fig. 5 shows the ring set for 100% or same size reproduction. After the ring 33 has been adjusted, the aperture diaphragm plate 29 is rotated relative to ring 33 to bring the proper reading of the scale 41 into registry with the index mark 40. Such adjustment will serve to position one of the apertures 30 in plate 29 in registry with the aperture 28 of the plate 26 and the size of the positioned aperture 30 will be adjusted in accordance with the particular camera extension used.

In order to insure that the positioned aperture 30 will be in proper registration with the plate aperture 28, the present invention provides a positive positioning means which serves to accurately align or register the apertures. In the preferred embodiment, the positioning means comprises a leaf spring 44, one end of which is received in a recess 45, formed in the back wall 46 of the plate 26, and is held in position in the recess by means of screws 47, as best shown in Fig. 7. The free end 48 of spring 44 extends across behind the calculator ring 33 to overlie the diaphragm plate 29, as best shown in Fig. 7. This free end 48 carries a pin 49 adapted to engage selectively in one of a series of annularly arranged recesses or depression 50 formed in the back 51 of plate 29. These recesses 50 are so positioned that when one of the apertures 30 of the diaphram plate 29 is brought into proper and accurate registration with the aperture 28 of stop plate 26, the pin 49 will register with and will snap into one of the recesses 50 under the action of spring 44 to position the aperture 33 and retain the registration thereof.

Figs. 8 to 9 show another form of Waterhouse stop on which a diaphragm of the iris type is used, the leaves 55 of which are positioned in a recess 56 formed in the back wall 57 with the aperture plate 26. These diaphragm leaves are connected, in a manner readily apparent to those in the art, to a diaphragm operating ring 58, and are so designed that equi-angular divisions on scale 59, to be later described, represent "f" numbers in logarithmic progression. By rotating the ring on the plate 29, the leaves 55 will be moved to vary the size of the diaphragm opening 60. Parts corresponding to Figs. 5 and 7 are designated by the same numerals. The plate 58 carries the logarithmic "f" scale 59 which is adapted to be brought into registry with the index mark 40 on the calculator ring 33, while the second index marked 39 on ring 33 cooperates with the scale 38, the figures of which are proportioned to the logarithm of $$\left(\frac{M}{100}+1\right)$$

Thus, by adjusting ring 33 to the desired percentage, 100% as shown in Fig. 8, and then adjusting the scale 59 to the proper position, f/256, as shown in Fig. 8, the diaphragm opening 60 will be positioned in accordance with the pre-selected percentage.

It will be apparent from the above description that the present invention provides an arrangement for use either on lens mounts or Waterhouse stops for accurately, quickly, and easily securing the desired diaphragm stop which is adjusted in accordance with the camera extension. The "f" scales 14, and 59 cooperate with diaphragm blades which are so shaped that equi-angular divisions on the scale represent "f" numbers in logarithmic progression, while the percentage of magnification scales 16 and 38 have the figures thereof angularly spaced in proportion to the logarithm of $$\left(\frac{M}{100}+1\right)$$

as above described. This combination of scales enables the process photographer to secure the desired diaphragm stop selected for camera extension without the necessity of resorting to expensive and unwieldy apparatus and/or tables. The result is that the stop can be adjusted with the minimum of time and cost, the advantages of which will be readily apparent to those in the art.

While certain embodiments of the invention have been disclosed, it is to be understood that the inventive idea may be carried out in a number of ways. This application is, therefore, not to be limited to the precise details disclosed, but is intended to cover all variations and modifications thereof falling within the scope of the appended claims.

We claim:

1. In a process lens mount, the combination with a lens tube having an adjustable diaphragm mounted therein, a scale member supported by said tube and calibrated in percentage of reproduction to copy size, an index member, means for mounting one of said members for rotational movement on said tube relative to the other member whereby the index member and a selected percentage may be placed in registry, a second scale member associated with said tube and calibrated to show the quotients of the ratios of camera extension to lens diaphragm diameter, a second index member, and means for rotatably mounting one of said second members on said tube so that said second members may be brought into registry to adjust the diaphragm diameter in accordance with a selected percentage, the other of said second members being positioned by the adjustment of said first movable member, said second movable member being operatively connected to said diaphragm, said first scale having percentage figures which are angularly arranged in proportion to the logarithm of $$\left(\frac{M}{100}+1\right)$$

2. In a process lens mount, the combination with a lens tube having an adjustable diaphragm mounted therein, a scale member supported by said tube and calibrated in percentage of reproduction to copy size, an index member, means for mounting one of said members for rotational movement on said tube relative to the other member whereby the index member and a selected percentage may be placed in registry, a second scale member associated with said tube and calibrated to show quotients of the ratios of camera extension to lens diaphragm diameter, a second index member, and means for rotatably mounting one of said second members on said tube so that said second members may be brought into registry to adjust the diaphragm diameter in accordance with a selected percentage, the other of said second members being positioned by the adjustment of said first movable member, said second movable member being operatively connected to said diaphragm, said first scale having percentage figures which are angularly arranged in proportion to the logarithm of $$\left(\frac{M}{100}+1\right)$$

while the second scale is calibrated so that equiangular divisions represent "f" numbers in logarithmic progression.

3. In a process lens mount, the combination with a lens tube having an adjustable diaphragm mounted therein, a scale member supported by said tube and calibrated in percentage of reproduction to copy size, an index member, one of said members being fixed, a calculator ring rotatably mounted relative to said lens barrel and carrying the other of said members whereby the rotation of said ring will relatively move said members so that the index member and a selected percentage may be placed in registry, a second scale member associated with said tube and calibrated to show quotients of the ratios of camera extension to lens diaphragm diameter, a second index member, one of said second members being mounted on said ring and movable relative to said other second member when said ring is rotated to position said one second member, said other second member being rotatably mounted relative to said tube to bring a selected portion of the latter into registry with said positioned one second member to adjust the diaphragm diameter in accordance with a selected percentage, said second scale being calibrated so that equi-angular divisions represent "f" numbers in logarithmic progression.

4. In a process lens mount, the combination with a lens tube having an adjustable diaphragm mounted therein, a scale member supported by said tube and calibrated in percentage of reproduction to copy size, an index member, one of said members being fixed, a calculator ring rotatably mounted relative to said lens barrel and carrying the other of said members whereby the rotation of said ring will relatively move said members so that the index member and a selected percentage may be placed in registry, a second scale member associated with said tube and calibrated to show quotients of the ratios of camera extension to lens diaphragm diameter, a second index member, one of said second members being mounted on said ring and movable relative to said other second member when said ring is rotated to position said one second member, said other second member being rotatably mounted relative to said tube to bring a selected portion of the latter into registry with said positioned one second member to adjust the diaphragm diameter in accordance with a selected percentage, said first scale having percentage figures which are angularly arranged in proportion to the logarithm of $$\left(\frac{M}{100}+1\right)$$

while the second scale is calibrated so that equiangular divisions represent "f" numbers in logarithmic progression.

5. In a process lens mount, the combination with a lens tube having an adjustable diaphragm mounted therein, a scale member arranged in fixed position relative to said tube and calibrated in percentage of reproduction to copy size, an index member mounted for movement relative to said scale and adjustable to a preselected percentage on said scale, a second index member movably mounted relative to said tube and movable upon adjustment of said first index member, a second scale member mounted for movement relative to said second index member and calibrated in terms of quotients of the ratios of camera extension to lens diaphragm diameter, the adjustments of said second scale member relative to said second index member serving to bring a part of said second scale member with registry with said second index member to adjust the diaphragm diameter in accordance with a selected percentage, said first scale having percentage figures which are angularly arranged in proportion to the logarithm of $$\left(\frac{M}{100}+1\right)$$

while the second scale is calibrated so that equiangular divisions represent "f" numbers in logarithmic progression.

6. In a process lens mount, the combination with a lens tube in which an adjustable diaphragm is mounted, a scale member arranged in fixed position relative to said tube and calibrated in percentage of reproduction to copy size, a rotatable diaphragm operating ring connected to said diaphragm for adjusting the latter, a second scale member carried by said operating ring, a rotatable calculator ring positioned intermediate said scale members, an index member carried by said calculator ring and movable relative to said first scale and cooperating therewith to bring said index member adjustably into registry with a selected percentage of said first scale, a second index member carried by said calculator ring and movable upon adjustment of said first index member relative to said first scale, rotation of said operating ring serving to bring a part of said second scale into registry with said adjusted second index to adjust the diaphragm diameter in accordance with a selected percentage, said first scale having percentage figures which are angularly arranged in proportion to the logarithm of $$\left(\frac{M}{100}+1\right)$$

while the second scale is calibrated so that equiangular divisions represent the "f" numbers in logarithmic progression, the angular spacing in the first scale from 0 to 100 per cent being equal to the angular spacing of the full stops of the second scale.

7. In a process lens mount, the combination with a lens tube in which an adjustable diaphragm is mounted, an index member, a logarithmic scale member calibrated in percentage of reproduction to copy size, a calculator ring rotatably mounted on said lens tube, said members being adjacently positioned and one being fixed on said tube and the other being carried by said ring so that rotation of the latter will move said members relatively to bring a selected percentage of said scale member into registry with the index member, a second index member carried by said ring and movable as a unit therewith, a diaphragm operating ring rotatably mounted on said tube and positioned adjacent said calculator ring, a scale carried by said diaphragm ring and positioned adjacent said second index member and calibrated so that equiangular divisions on the scale represent "f" numbers in logarithmic progression, the movement of said diaphragm ring serving to bring a part of said second scale into registry with said second index member to adjust the diaphragm diameter in accordance with a selected percentage.

8. In a process lens, the combination with a lens mount provided with a slot, of an apertured plate insertable in said slot, an adjustable diaphragm carried by said plate for controlling the effective area of the aperture thereof, a scale member carried by said plate and calibrated in percentage of reproduction to copy size, an index member on said plate adjacent said scale member and adapted to cooperate therewith, said members being movable relatively whereby the index member may be placed in registry with a selected percentage, a second index member on said plate operatively connected to and adjusted when said first index member is positioned relative to said scale member, a second scale member operatively connected to said diaphragm so that adjustment of said second scale member will vary the size of the diaphragm opening, said second scale member being calibrated in terms of quotients of the ratios of camera extension to lens diaphragms so that when a part of said second scale is positioned in registry with the adjusted second index member the diaphragm opening will be adjusted in accordance with selected percentage, said second scale being calibrated so that equi-angular divisions represent "f" numbers in logarithmic progression.

9. In a process lens, the combination with a lens mount provided with a slot, of an apertured plate insertable in said slot, an adjustable diaphragm carried by said plate for controlling the effective area of the aperture thereof, a scale member carried by said plate and calibrated in percentage of reproduction to copy size, an index member on said plate adjacent said scale member and adapted to cooperate therewith, one of said members being fixed, one of said members being movable so that said index member will register with a selected percentage of said scale member, a second index member operatively connected to said moving means and positioned when said first index and scale members are adjusted, a movable second scale member operatively connected to said diaphragm so that movement of said second scale member will vary the size of the diaphragm opening, said second scale member being calibrated in terms of quotients of the ratios of camera extension to lens diaphragm diameter so that when a part of said second scale is moved into registry with the positioned second index member the diaphragm size will be adjusted in accordance with the selected percentage, said first scale having percentage figures which are angularly arranged in proportion to the logarithm of $$\left(\frac{M}{100}+1\right)$$

while the second scale is calibrated so that equiangular divisions represent the "f" numbers in logarithmic progression.

10. In a process lens, the combination with a lens mount provided with a slot, of an apertured plate insertable in said slot, an adjustable diaphragm carried by said plate for controlling the effective area of the aperture thereof, a scale member carried by said plate and calibrated in percentage of reproduction to copy size, an index member on said plate adjacent said scale member and adapted to cooperate therewith, one of said members being fixed, the other of said members being movable so that said index member will register with a selected percentage of said scale member, a second index member operatively connected to said moving means and positioned when said first index and scale members are adjusted to rotatable diaphragm operating ring carried by said plate and operatively connected to said diaphragm so that rotation of said plate will vary the size of the diaphragm opening, a scale member carried by said operating ring and calibrated to show the quotients of the ratios of camera extension to lens diaphragm diameter so that movement of said operating ring to bring a part thereof into registry with the adjusted second scale member will adjust said diaphragm diameter in accordance with the selected percentage, said first scale having percentage figures which are angularly arranged in proportion to the logarithm of $$\left(\frac{M}{100}+1\right)$$

while the second scale is calibrated so that equiangular divisions represent "f" numbers in logarithmic progression.

11. In a process lens, the combination with a lens mount provided with a slot, of an apertured plate insertable in said slot, an adjustable diaphragm carried by said plate for controlling the effective area of the aperture thereof, a logarithmic scale member carried by said plate and calibrated in percentage of reproduction to copy size, an index member, a calculator ring rotatably mounted on said plate, one of said members being arranged in fixed position on said plate adjacent said calculator ring and the other member being carried by said ring so that upon rotating the latter a selected percentage of said scale member and said index may be brought into registry, a second index member carried by said calculator ring and adjusted when said ring is rotated, a diaphragm operating ring rotatably carried by said plate, a logarithmic scale carried by said operating ring and calibrated to show quotients of the ratios of camera extension to lens diaphragm diameter, the rotation of said operating ring serving to bring a part of said second scale into registry with said second index to adjust the diaphragm diameter in accordance with the selected percentage.

12. In a process lens, the combination with a lens mount provided with a slot, of an apertured plate insertable in said slot, an adjustable iris diaphragm carried by said plate, a diaphragm operating ring, an annular logarithmic scale carried by said plate and calibrated in percentage of reproduction to copy size, a second annular logarithmic scale concentric with said first scale carried by said operating ring and calibrated to show quotients of the ratios of camera extension to lens diaphragm diameter, a calculator ring positioned between said scale members and rotatably mounted on said plate, and a pair of index members carried by said plate, one of said index members adapted to cooperate with a selected percentage of said second scale, said operating ring being then adjustable to bring a part of said first scale into registry with the other of said index member to adjust said diaphragm opening in accordance with the selected percentage.

13. In a process lens, the combination with a lens mount provided with a slot, of an apertured plate insertable in said slot, a diaphragm plate rotatably mounted on said apertured plate and formed with a series of annularly arranged openings of progressively varying diameters adapted to be brought selectively into registry with the aperture of said first plate to control the diaphragm diameter, a percentage of magnification scale arranged in fixed position on said first plate and concentric with said diaphragm plate, said scale having the figures thereon angularly spaced in proportion to the logarithm of $$\left(\frac{M}{100}+1\right)$$

a calculator ring movably mounted on said first plate and positioned intermediate said diaphragm plate and said scale member, a pair of index members carried by said calculator ring, one of said index members being movable into registry with a selected percentage of said scale member when said calculator ring is moved relative to said first plate, and a second scale mounted on said diaphragm plate and positioned adjacent said calculator ring so that said diaphragm ring may be rotated on said first plate to bring a part of said second scale into registry with the other of said index members to adjust the diaphragm opening in accordance with the selected percentage.

14. In a process lens, the combination with a lens mount provided with a slot, of an apertured plate insertable in said slot, a diaphragm plate rotatably mounted on said apertured plate and formed with a series of annularly arranged openings of progressively arranged diameters adapted to be brought selectively into registry with the aperture of said first plate to control the diaphragm diameter, a scale arranged in fixed position on said first plate and concentric with said diaphragm plate, said scale being a logarithmic arrangement of the percentages of reproduction to copy size, a calculator ring movably mounted on said first plate and positioned intermediate said diaphragm plate and said scale member, a pair of index members carried by said calculator ring, one of said index members being movable into registry with a selected percentage of said scale member when said calculator ring is moved relative to said first plate, and a second scale member on said diaphragm plate positioned adjacent said calculator ring so that said diaphragm ring may be rotated on said first plate to bring a part of said second scale into registry with the other of said index members to adjust the diaphragm opening in accordance with the selected percentage, said second scale being calibrated so that equi-angular divisions represent "f" numbers in logarithmic progression.

15. In a process lens, the combination with a lens mount provided with a slot, of an apertured plate insertable in said slot, a diaphragm plate rotatably mounted on said apertured plate and formed with a series of annularly arranged openings of progressively arranged diameters adapted to be brought selectively into registry with the aperture of said first plate to control the diaphragm diameter, a scale arranged in fixed position on said first plate and concentric with said diaphragm plate, said scale having the figures thereof angularly spaced in proportion to the logarithm of $$\left(\frac{M}{100}+1\right)$$

a calculator ring movably mounted on said first plate and positioned intermediate said diaphragm plate and said scale member, a pair of index members carried by said calculator ring, one of said index members being movable into registry with a selected figure of said scale member when said calculator ring is moved relative to said first plate, a logarithmically calibrated "f" scale member on said diaphragm plate positioned adjacent said calculator ring so that said diaphragm ring may be rotated on said first plate to bring a part of said second scale into registry with the other of said index members to adjust the diaphragm opening in accordance with the selected percentage and spring means for retaining said diaphragm plate in adjusted position on said first plate, the angular spacing in the first scale from 0 to 100 per cent being equal to the angular spacing of two full stops on the second scale.

JOHN H. EAGLE.
CHARLES M. LEE.